(12) United States Patent
Hoffman

(10) Patent No.: US 9,205,882 B1
(45) Date of Patent: Dec. 8, 2015

(54) HAND GRIP FOR INDUSTRIAL VEHICLES

(71) Applicant: Matthew K. Hoffman, Greenville, NC (US)

(72) Inventor: Matthew K. Hoffman, Greenville, NC (US)

(73) Assignee: NACCO Materials Handling Group, Inc., Fairview, OR (US)

( * ) Notice: Subject to any disclaimer, the term of this patent is extended or adjusted under 35 U.S.C. 154(b) by 150 days.

(21) Appl. No.: 13/678,957

(22) Filed: Nov. 16, 2012

Related U.S. Application Data

(60) Provisional application No. 61/561,235, filed on Nov. 17, 2011.

(51) Int. Cl.
*B62D 51/00* (2006.01)
*B62D 51/04* (2006.01)
*B62B 5/00* (2006.01)

(52) U.S. Cl.
CPC ............ *B62D 51/001* (2013.01); *B62B 5/0026* (2013.01); *B62B 5/0069* (2013.01); *B62D 51/04* (2013.01)

(58) Field of Classification Search
CPC ........ B62B 5/0026; B62B 5/06; B62B 5/061; B62B 5/0069; B62D 51/001; B62D 51/04
USPC ................. 180/19.1–19.3, 332, 333
See application file for complete search history.

(56) References Cited

U.S. PATENT DOCUMENTS

| | | | | |
|---|---|---|---|---|
| 2,913,062 | A * | 11/1959 | Ulinski | 180/19.2 |
| 3,529,689 | A * | 9/1970 | Goodacre et al. | 180/19.2 |
| 3,738,441 | A * | 6/1973 | Kemner | 180/65.1 |
| 4,287,966 | A * | 9/1981 | Frees | 187/231 |
| 4,444,284 | A * | 4/1984 | Montemurro | 180/19.1 |
| 4,645,030 | A * | 2/1987 | von Bernuth et al. | 180/333 |
| 4,716,980 | A * | 1/1988 | Butler | 180/19.2 |
| 5,245,144 | A | 9/1993 | Stammen | |
| D364,029 | S | 11/1995 | Noonan et al. | |
| D374,534 | S | 10/1996 | Munde et al. | |
| 5,595,259 | A | 1/1997 | Gilliland et al. | |
| D384,478 | S | 9/1997 | Prehn et al. | |
| 5,964,313 | A * | 10/1999 | Guy | 180/332 |
| 6,276,471 | B1 * | 8/2001 | Kratzenberg et al. | 180/19.3 |
| 6,276,485 | B1 * | 8/2001 | Eriksson et al. | 180/332 |
| 6,382,359 | B1 * | 5/2002 | Lohmann | 187/231 |
| D497,463 | S | 10/2004 | Swetish | |
| 6,883,625 | B2 * | 4/2005 | Trego et al. | 180/19.2 |
| 7,025,157 | B2 | 4/2006 | Lindsay et al. | |
| 7,040,427 | B2 | 5/2006 | Toomey | |
| 7,237,645 | B2 * | 7/2007 | Lohmann et al. | 180/332 |
| 7,383,915 | B2 | 6/2008 | David et al. | |
| D593,274 | S | 5/2009 | Knie et al. | |

(Continued)

FOREIGN PATENT DOCUMENTS

DE 4413631 C2 2/1996
EP 1867549 * 12/2007 ............... B62B 5/06

*Primary Examiner* — Anne Marie Boehler
*Assistant Examiner* — Maurice Williams

(57) ABSTRACT

In one embodiment, a handle is attached to a vehicle tiller arm. The handle includes a first pair of gripping portions and a second pair of gripping portions. A first throttle actuator is configured and located such that it is operable by either hand of an operator while the operator grasps each of the first pair of gripping portions while the tiller arm is substantially vertical. A second throttle actuator is configured and located such that it is operable by either hand of an operator while the operator grasps each of the second pair of gripping portions and the tiller arm is not substantially vertical.

11 Claims, 6 Drawing Sheets

(56) References Cited

U.S. PATENT DOCUMENTS

| | | |
|---|---|---|
| D609,424 S | 2/2010 | Knie et al. |
| 7,661,493 B2 | 2/2010 | Rose |
| D655,064 S | 2/2012 | Knie |
| 8,523,224 B2 * | 9/2013 | Gallagher et al. ............ 280/748 |
| 2003/0029648 A1 * | 2/2003 | Trego et al. ................... 180/19.1 |
| 2004/0099453 A1 * | 5/2004 | Guy ............................. 180/65.1 |
| 2004/0251073 A1 * | 12/2004 | Gerbier et al. ................ 180/333 |
| 2006/0245866 A1 | 11/2006 | Rose et al. |
| 2009/0242284 A1 * | 10/2009 | Whetstone, Jr. ............. 180/19.2 |
| 2009/0242285 A1 * | 10/2009 | Whetstone, Jr. ............. 180/19.2 |
| 2011/0126354 A1 * | 6/2011 | Hamberg et al. .................. 5/600 |

* cited by examiner

HAND GRIP FOR INDUSTRIAL VEHICLES

TECHNICAL FIELD

The present invention relates to handles connected to tiller arms that are used for controlling industrial vehicles.

SUMMARY

In one embodiment, a handle is attached to a vehicle tiller arm. The handle includes a first pair of gripping portions and a second pair of gripping portions. A first throttle actuator is configured and located such that it is operable by either hand of an operator while the operator grasps each of the first pair of gripping portions while the tiller arm is substantially vertical. A second throttle actuator is configured and located such that it is operable by either hand of an operator while the operator grasps each of the second pair of gripping portions and the tiller arm is not substantially vertical.

DETAILED DESCRIPTION

The present inventor has recognized that spaces for storing and displaying goods, such as in retail stores and warehouses, are becoming more compact and tight; in other words, that there is less room available to move persons and vehicles around stored goods. The present inventor has also recognized that industrial vehicles commonly need to maneuver around compactly stored goods and that walls and other obstructions, such as shelves and machinery, hinder operation of a typical industrial vehicle that is steered using a handle attached to a tiller arm, especially when operated in relatively tight confines such as smaller retail stores.

Figure 1:
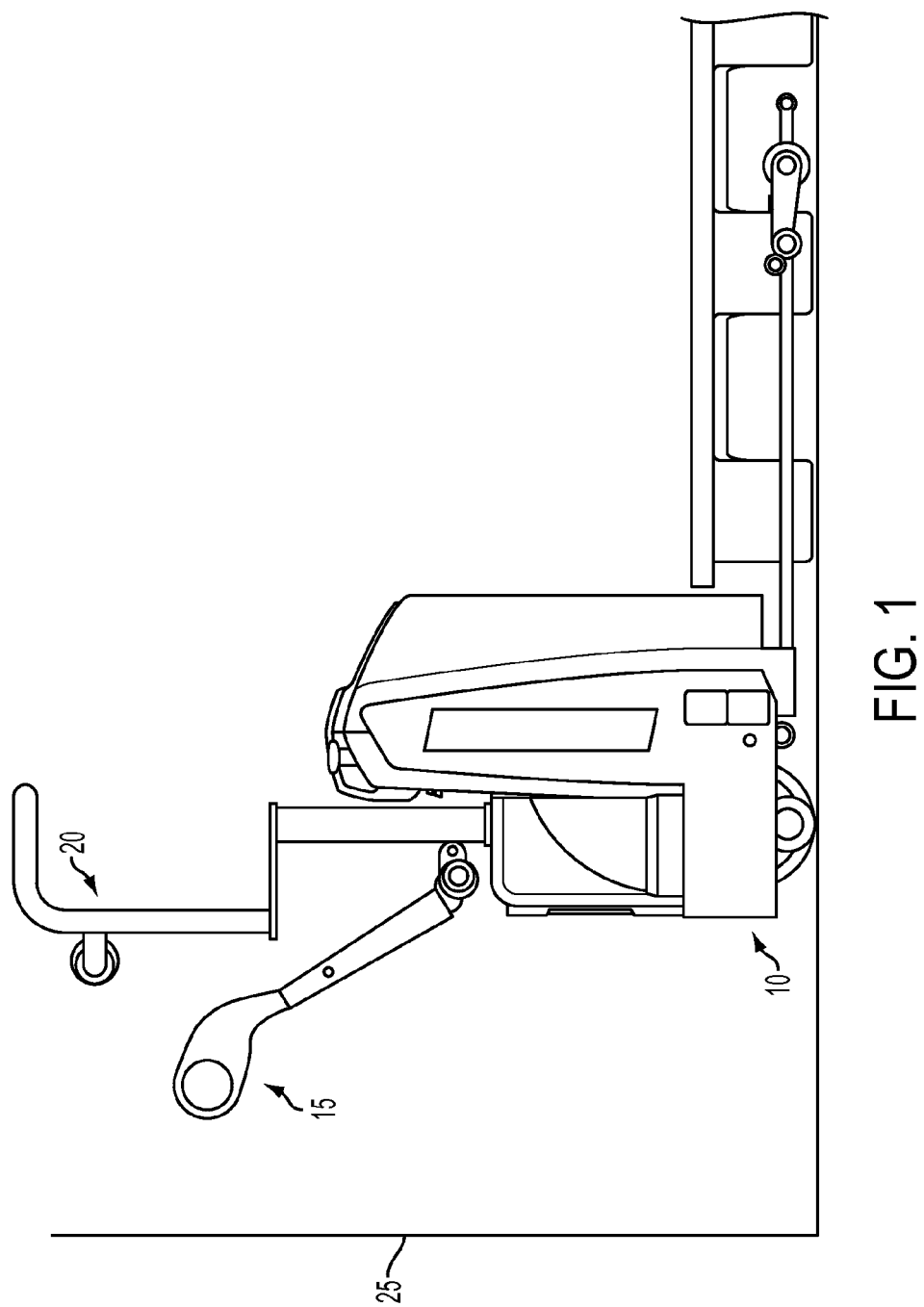
FIG. 1 is a left side plan view of a hypothetical pallet truck having a pivoting tiller arm coinciding with a non-pivoting tiller arm.

FIG. 1 illustrates a hypothetical pallet truck 10 having a pivoting tiller arm 15 coinciding with a non-pivoting tiller arm 20 to demonstrate problems with existing tiller arm and handle combinations recognized by the present inventor. Pivoting tiller arm 15 is illustrated in a not substantially vertical orientation associated with operation of the pallet truck 10. Commonly available handles, such as attached to pivoting tiller arm 15, for steering an industrial vehicle via a tiller arm are typically designed to operate in an orientation such as illustrated for pivoting tiller arm 15 in FIG. 1. However, should an operator need to maneuver pallet truck 10 in a tight space where an obstacle is present, such as wall 25, it may not be practical for the operator to use the pivoting tiller arm 15 and commonly available handle combination in a not substantially vertical position. Instead, the operator may need to place the pivoting tiller arm 15 in a substantially vertical position, such as illustrated for tiller arm 20 in FIG. 1, to clear the obstacle, leave room for the operator's body and maneuver the industrial vehicle. The present inventor has recognized that commonly available handles used with tiller arms to steer industrial vehicles may be too small and not suitably configured to facilitate maneuvering an industrial vehicle with the tiller arm in a substantially vertical position.

Figure 2:
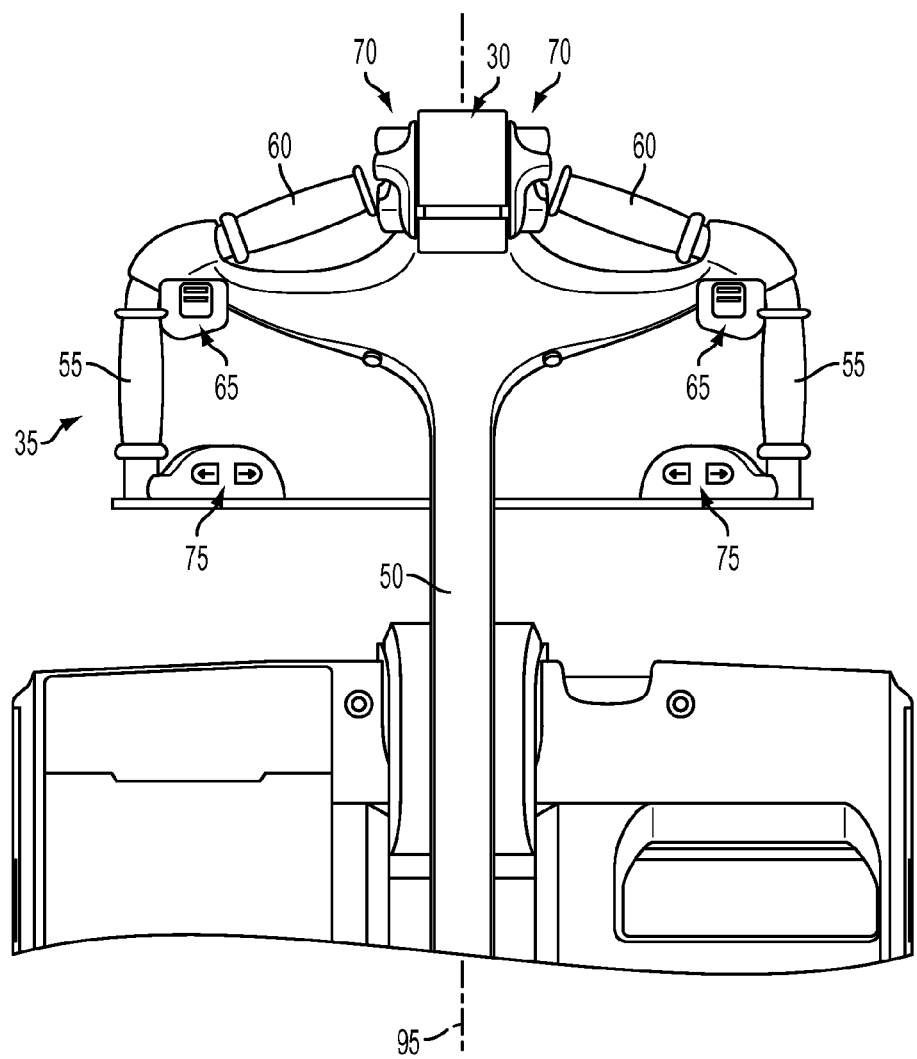
FIG. 2 is a front plan view of an embodiment of a handle.
Figure 3:
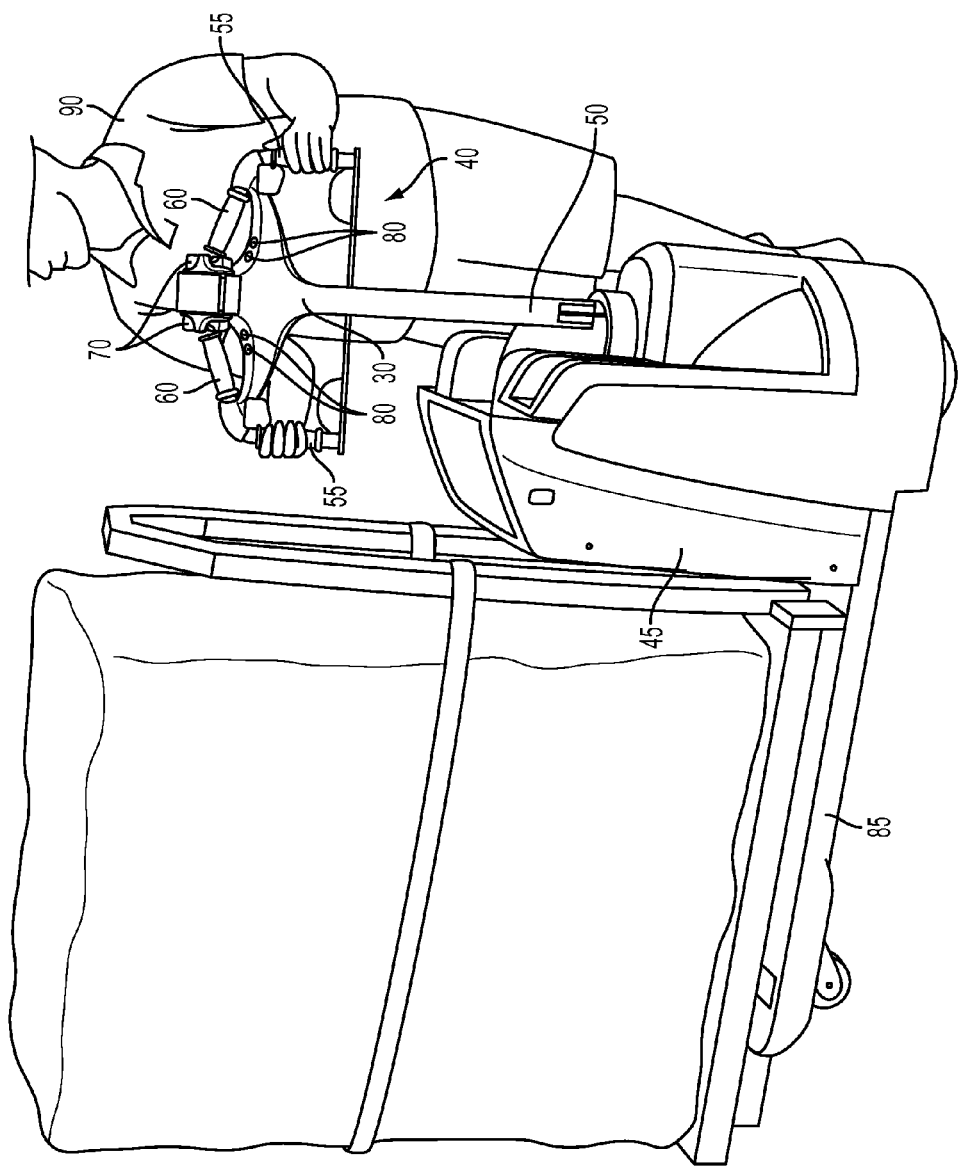
FIG. 3 is a rear plan view of the embodiment of FIG. 2 and illustrates an operator operating a pallet truck with the embodiment of FIG. 2 in a first position.
Figure 5:
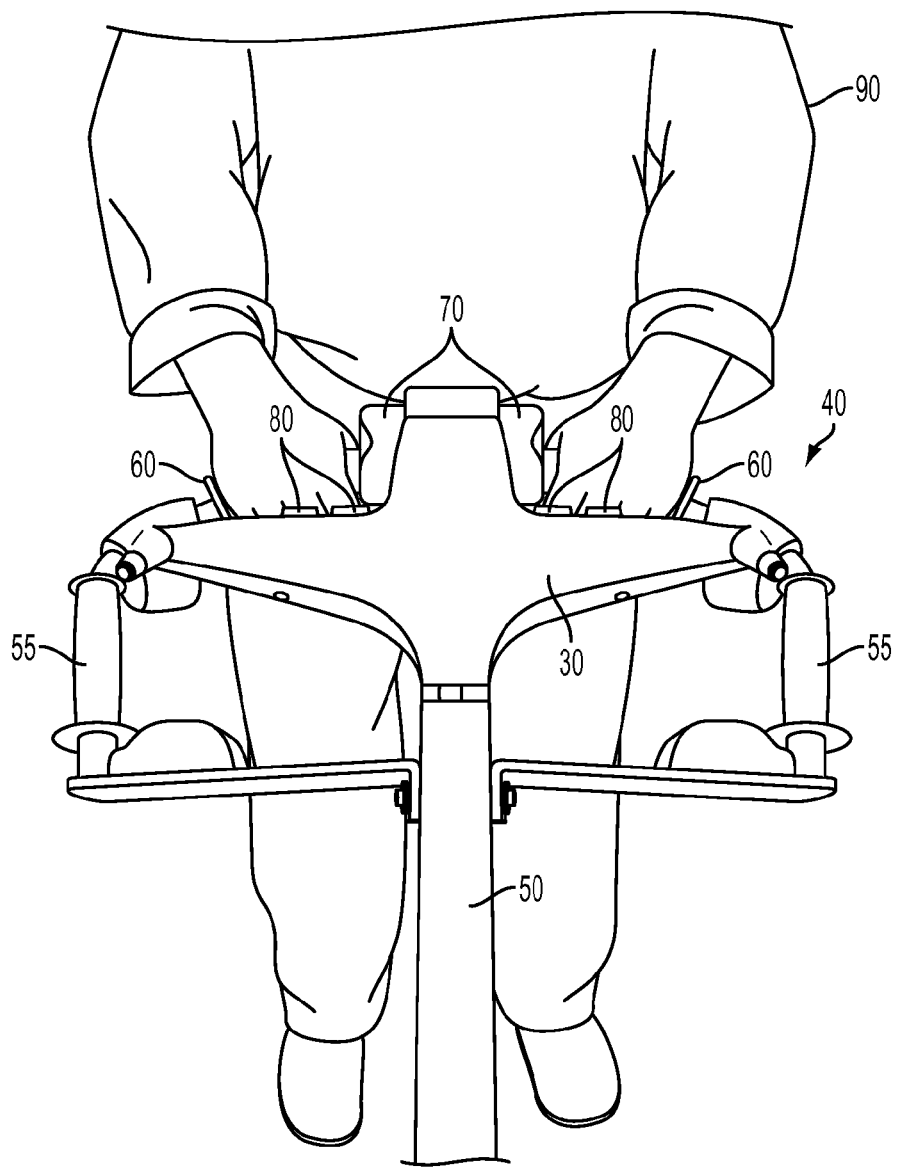
FIG. 5 illustrates an operator operating a pallet truck with the embodiment of FIG. 2 in a second position.
Figure 6:
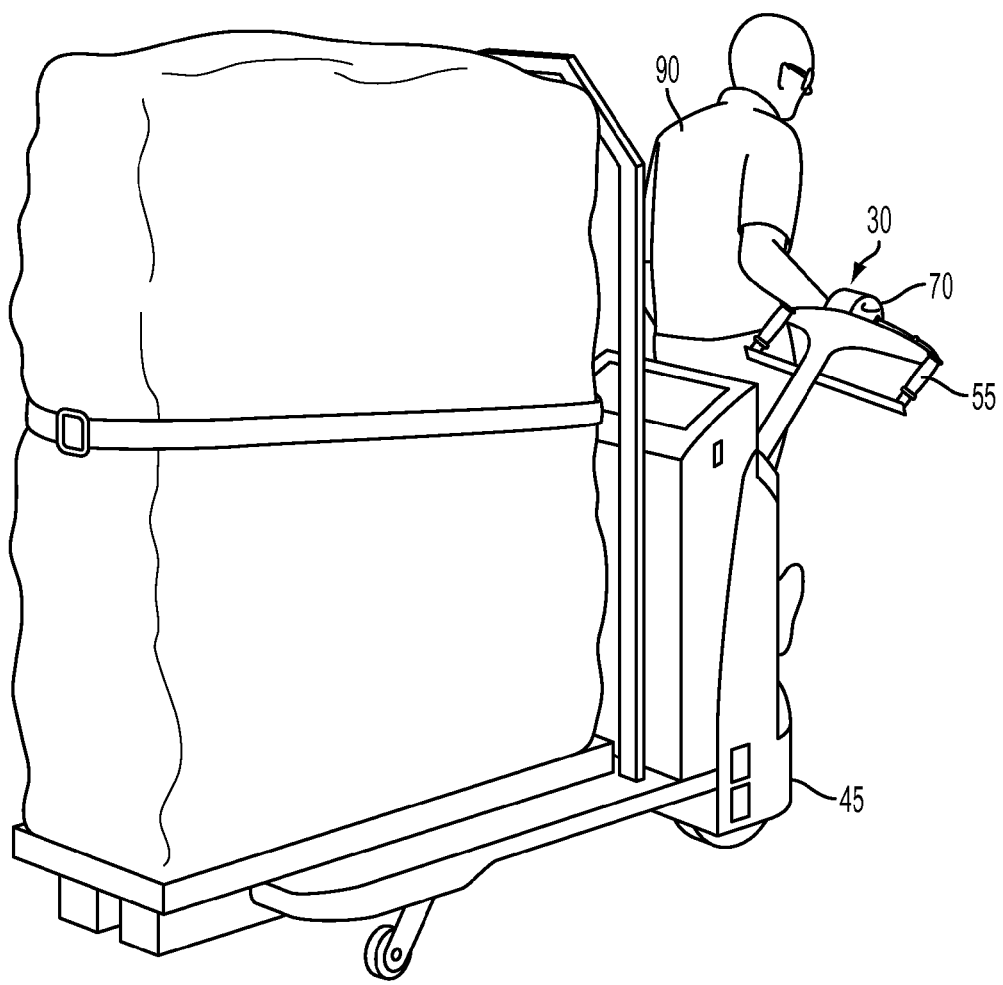
FIG. 6 illustrates an operator operating a pallet truck with the embodiment of FIG. 2 in a third position.

An embodiment of a handle for use with a tiller arm to steer an industrial vehicle is illustrated in FIGS. 2 and 3. Handle 30 includes a first face 35 (FIG. 2) and a second face 40 (FIG. 3). The components of handle 30 are sized and configured to facilitate maneuvering an industrial vehicle, such as pallet truck 45, with the tiller arm 50 in a substantially vertical orientation (FIG. 3) as well as to facilitate maneuvering the pallet truck 45 with the tiller arm 50 in a not substantially vertical position (FIGS. 5 and 6). In some embodiments, a tiller arm 50 is in a substantially vertical position when an axis 95 of the tiller arm 50 is angled between about −10° and about 15° with respect to a surface on which an industrial vehicle is supported. Tiller arm 50 is not in a substantially vertical position when the angular relationship of axis 95 and such a surface is outside the range of about −10° to about 15° with respect to such a surface. In other embodiments, tiller arm 50 may be in a substantially vertical position when it is within a subset of angular ranges of about −10° to about 15° with respect to such a surface, for example, about 0° to about 10°, and is not in a substantially vertical position when it is outside such a subset of angular ranges.

A first pair of gripping portions 55 is preferably substantially vertically oriented when the tiller arm 50 is substantially vertically oriented. A second pair of gripping portions 60 is preferably oriented such that an operator's hands are pronated when the operator grasps the second pair of gripping portions 60 regardless of whether the tiller arm 50 is substantially vertically oriented. The second pair of gripping portions 60 may have other orientations.

A first throttle actuator, such as a pair of toggle switches 65, is positioned on handle 30 such that the first throttle actuator is operable by either hand of the operator while the operator grasps each of the first pair of gripping portions 55 and the tiller arm 50 is substantially vertical. The first throttle actuator may include a pair of toggle switches 65 (as illustrated in FIG. 2), or may include other suitable actuators such as, but not limited to, one or more suitably located roller wheels, toggle switches, paddles, rotary grips, variable handles, pistol grips, buttons, switches, or other acceleration controls, singularly or in any combination thereof. When the first throttle actuator includes a single element (such as a single toggle switch) the single element is preferably sized and located such that either hand of the operator can actuate the single element while both hands remain grasping the first pair of gripping portions 55.

A second throttle actuator, such as rotary switches 70, is positioned on handle 30 such that the second throttle actuator is operable by either hand of the operator while the operator grasps each of the second pair of gripping portions 60 and the tiller arm 50 is not substantially vertical. In some embodiments, an operator may grip both of the second pair of gripping portions 60 and operate the second throttle actuator throughout the full range of motion for the tiller arm 50. The second throttle actuator may include a pair of rotary switches 70 (as illustrated in FIG. 2), or may include other suitable actuators such as, but not limited to, one or more suitably located roller wheels, paddles, variable handles, pistol grips, buttons, switches, toggles, or other acceleration controls, singularly or in any combination thereof. When the second throttle actuator includes a single element (such as a single paddle) the single element is preferably sized and located such that either hand of the operator can actuate the single element while both hands remain grasping the second pair of gripping portions 60.

In certain embodiments, each of the grips of the first pair of gripping portions 55 are preferably located a distance apart within the range of 40 cm to 46 cm, and preferably 42 cm to 44 cm. The grips of the first pair of gripping portions 55 preferably include protection for an operator's hands, such as a guard 56 located over the grips, or by locating the grips inward of the outer portions of the handle 30. Configuring and positioning the first throttle actuator such that an operator may grasp each of the grips of the first pair of gripping portions 55 and operate the first throttle actuator, such as the toggle switches 65, facilitates steering the pallet truck 45 with tiller arm 50 in a substantially vertical position. Providing a relatively large distance between the grips of the first pair of gripping portions 55 provides an operator with additional leverage for turning a steered wheel (not illustrated) using the tiller arm 50 in a substantially vertical position compared to a relatively small distance between the grips of a typical handle. Providing a relatively large distance between the grips of the first pair of gripping portions 55 also permits an operator to ergonomically use more back muscles for turning a steered wheel using the tiller arm 50 in a substantially vertical position compared to a typical handle. Providing a separate throttle actuator associated with the first pair of gripping portions 55 permits an operator to maintain control of the tiller arm 50 using both hands while maneuvering the pallet truck 45.

Optionally, on the first face 35 handle 30 includes a first actuator, such as switches 75, for controlling a vehicle function, and on the second face 40 handle 30 includes a second actuator, such as switches 80, for controlling the same vehicle function. For example, if industrial vehicle 45 is a pallet truck, the first switches 75 and the second switches 80 may control lifting and lowering a set of forks 85. Preferably, the operator's view of the first switches 75 is unobstructed when the tiller arm 50 is substantially vertical and becomes obstructed as the handle 30 is moved to a not substantially vertical position. Likewise, the operator's view of the second switches 80 is preferably at least partially obstructed when the tiller arm 50 is substantially vertical and the operator faces the first face 35 and becomes un-obstructed as the handle 30 is moved from a substantially vertical position to a not substantially vertical position. Causing the first switches 75 and the second switches 80 to become visually obstructed or unobstructed based on the position of the tiller arm 50 and the operator's position with respect to the handle 30 may facilitate use of handle 30 by presenting a single actuator at a time for the operator to use to control the vehicle function.

Figure 4:
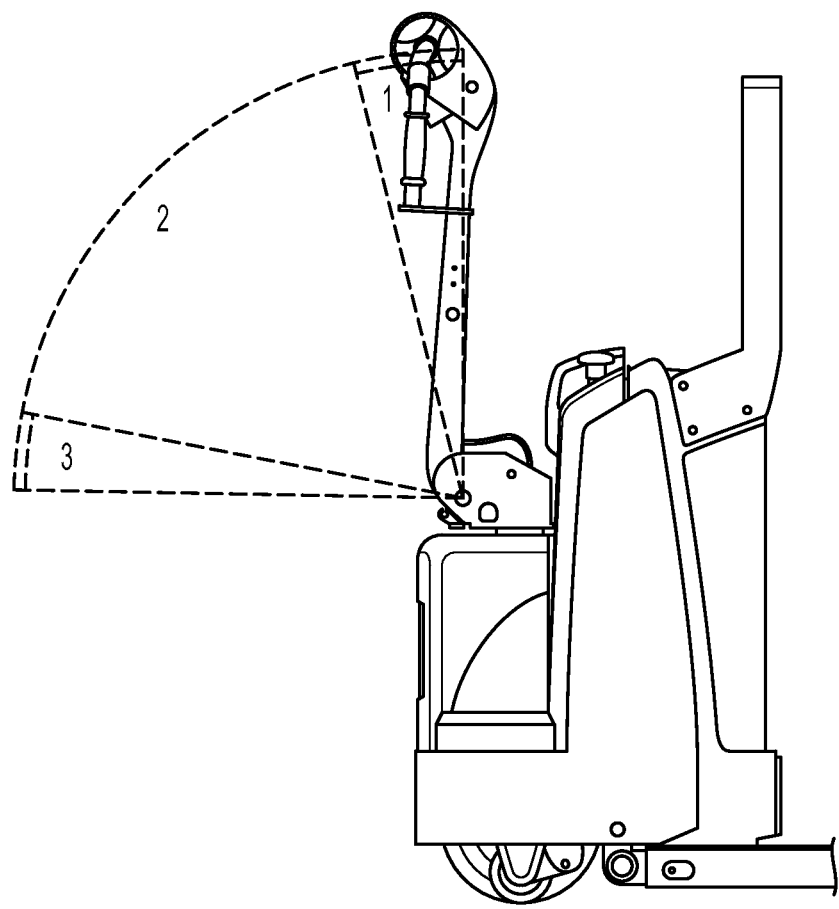
FIG. 4 illustrates three operational zones for a tiller arm.

Preferably, the first throttle actuator, such as toggle switches 65, is enabled when tiller arm 50 is in a substantially vertical position and the second throttle actuator, such as rotary switches 70, is disabled when tiller arm 50 is in a substantially vertical position. For example, when the free end of tiller arm 50 is in zone 1 (FIG. 4) a deadman brake is engaged, the first throttle actuator is enabled and the second throttle actuator is disabled. Actuation of the second throttle actuator with the free end of tiller arm 50 in zone 1 causes no movement of the pallet truck 10. However, actuating the first throttle actuator, such as either of the toggle switches 65, deactivates the deadman brake and causes the pallet truck 10 to move in a desired direction. Preferably, the first throttle actuator is disabled when tiller arm 50 is not in a substantially vertical position and the second throttle actuator is enabled when tiller arm 50 is not in a substantially vertical position. For example, when the free end of tiller arm 50 is in zone 2 (FIG. 4) a deadman brake is disengaged, the first throttle actuator is disabled and the second throttle actuator is enabled. Actuation of the first throttle actuator with the free end of tiller arm 50 in zone 2 causes no movement of the pallet truck 10. However, actuating the second throttle actuator, such as either of the rotary switches 70, causes the pallet truck 10 to move in a desired direction. Preferably, both the first and second throttle actuators are disabled when the tiller arm 10 is in a braking position. For example, when the free end of tiller arm 50 is in zone 3 (FIG. 4) the deadman brake is engaged and both the first and second throttle actuators are disabled. Optionally, the first throttle actuator is configured such that operating the first throttle actuator to its fullest extent provides a vehicle top speed that is less than the vehicle top speed when the second throttle actuator is operated to its fullest extent. For example, operating either rotary switch 70 to its fullest extent may cause pallet truck 45 to travel at 6.0 kilometers per hour and operating either toggle switch 65 to its fullest extent may cause pallet truck 45 to travel at 2.5 kilometers per hour.

An operator 90 has a variety of options for using handle 30 to control pallet truck 45; three such options are described. As illustrated in FIG. 3, with tiller arm 50 in a substantially vertical position an operator 90 grasps one grip of the first pair of gripping portions 55 with one hand and the other grip of the first pair of gripping portions 55 with the other hand. Using both hands and engaging primarily muscles in the torso and back, operator 90 rotates handle 30 about axis 95 thus turning a steered wheel (not illustrated). In part due to the relatively large spacing between the grips of the first pair of gripping portions 55 and in part due to the orientation of the operator 90's hands between a pronated and supinated position, handle 30 facilitates rotating a steered wheel when tiller arm 50 is in a substantially vertical position. While grasping both grips of the first pair of gripping portions 55, operator 90 may activate the first throttle actuator by moving either of the toggle switches 65, for example, with a thumb from either hand. Using the toggle switches 65, the operator 90 may move the pallet truck 45 either in a first direction or in a second direction. An operator 90 may thus use handle 30 to facilitate controlling an industrial vehicle, such as pallet truck 45, in relatively tight spaces, such as in a convenience store, where obstacles hinder lowering the tiller arm 50 to obtain a greater steering leverage.

As illustrated in FIG. 5, with tiller arm 50 not in a substantially vertical position an operator 90 grasps one grip of the second pair of gripping portions 60 with one hand and the other grip of the second pair of gripping portions 60 with the other hand. Using both hands and engaging primarily muscles in the arms and shoulders, operator 90 rotates handle 30 about axis 95 thus turning a steered wheel (not illustrated). In part due to the leverage provided by tiller arm 50 when not in a substantially vertical position, handle 30 facilitates rotating a steered wheel when tiller arm 50 is not in a substantially vertical position. While grasping both grips of the second pair of gripping portions 60, operator 90 may activate the second throttle actuator by rotating either of the rotary switches 70, for example, with a thumb from either hand. Using the rotary switches 70, the operator 90 may move the pallet truck 45 either in a first direction or in a second direction. An operator 90 may thus use handle 30 to facilitate controlling an industrial vehicle, such as pallet truck 45, in spaces that are not relatively tight, such as moving through the entrance of a convenience store, where there is substantially nothing to hinder lowering the tiller arm 50 to obtain a greater steering leverage.

As illustrated in FIG. 6, with tiller arm 50 not in a substantially vertical position an operator 90 grasps one grip of the second pair of gripping portions 60 with one hand. Alternately, the operator 90 may stand on the opposite side of pallet truck 45 and grasp the other grip of the second pair of gripping portions 60 with the other hand. Using one hand and engaging primarily muscles in the arms and shoulders, operator 90 rotates handle 30 about axis 95 thus turning a steered wheel (not illustrated). In part due to the leverage provided by tiller arm 50 when not in a substantially vertical position, handle 30 facilitates rotating a steered wheel when tiller arm 50 is not in a substantially vertical position. While grasping one grip of the second pair of gripping portions 60, operator 90 may activate the second throttle actuator by rotating the rotary switch 70 that is proximate the grasped grip, for example, with an outside edge of a hand or with a finger. Using one rotary switch 70, the operator 90 may move the pallet truck 45 either in a first direction or in a second direction. An operator 90 may thus use handle 30 to facilitate controlling an industrial vehicle, such as pallet truck 45, at a relatively fast speed in spaces that are not relatively tight, such as from a truck to a convenience store, where there is substantially nothing to hinder lowering the tiller arm 50 to obtain a greater steering leverage.

It will be obvious to those having skill in the art that many changes may be made to the details of the above-described embodiments without departing from the underlying principles of the invention. For example, in some embodiments a tiller arm may be fixed in a substantially vertical position. In other embodiments, a tiller arm may be configured to have an adjustable height, for example, the height of the first gripping portions 55, of the second gripping portions 60, or both may be adjustable according to the height of the operator, the mode of operation, or both. In other embodiments, a handle, such as handle 30, may be configured to have an adjustable reach in horizontal direction, vertical direction, or both. The scope of the present invention should, therefore, be determined only by the following claims.

The invention claimed is:

1. A handle attached to a vehicle tiller arm that is connected to a tiller arm pivot that enables the tiller arm to move between a substantially vertical range and a not substantially vertical range, the handle comprising:
a first face on one side of the handle and a second face on an opposite side of the handle such that the first face is oriented in a direction that is substantially opposite to a direction in which the second face is oriented, and both the first face and the second face are substantially vertically disposed when the handle is at an upright position;
a first pair of gripping portions;
a second pair of gripping portions;
a first throttle actuator that is operable by either hand of an operator while the operator grasps each of the first pair of gripping portions and the tiller arm is substantially vertical; and
a second throttle actuator that is operable by either hand of an operator while the operator grasps each of the second pair of gripping portions and the tiller arm is not substantially vertical;
a first actuator for controlling a vehicle function positioned on the first face; and
a second actuator for controlling the vehicle function positioned on the second face; wherein
the first throttle actuator is configured to cause the vehicle to move in a first direction and in a second direction opposite the first direction based on operator actuation of the first throttle actuator;
the second throttle actuator is configured to cause the vehicle to move in the first direction and in the second direction based on operator actuation of the second throttle actuator;
the first throttle actuator is enabled and the second throttle actuator is disabled when the tiller arm is in the substantially vertical range; and
the first throttle actuator is disabled and the second throttle actuator is enabled when the tiller arm is not in the substantially vertical range.

2. A handle according to claim 1, wherein:
the first pair of gripping portions are dimensioned and located on the handle a distance apart within a range of 40 centimeters to 46 centimeters.

3. A handle attached to a vehicle tiller arm comprising:
a first pair of gripping portions;
a second pair of gripping portions;
a first throttle actuator that is operable by either hand of an operator while the operator grasps each of the first pair of gripping portions and the tiller arm is substantially vertical; and
a second throttle actuator that is operable by either hand of an operator while the operator grasps each of the second pair of gripping portions and the tiller arm is not substantially vertical;
wherein the handle includes a first face on one side of the handle and a second face on an opposite side of the handle such that the first face is oriented in a direction that is substantially opposite to a direction in which the second face is oriented, and both the first face and the second face are substantially vertically disposed when the handle is at an upright position, further comprising:
a first actuator for controlling a vehicle function positioned on the first face; and
a second actuator for controlling the vehicle function positioned on the second face.

4. A handle according to claim 3 wherein the vehicle function is lifting and lowering a set of forks.

5. A handle according to claim 3 further comprising:
a tiller arm pivot that enables the tiller arm to move between a substantially vertical range and a not substantially vertical range;
wherein a view from the rear of a vehicle of the first actuator for controlling the vehicle function becomes obstructed as the handle is moved from the substantially vertical range to the not substantially vertical range; and
a view from the rear of the vehicle of the second actuator for controlling the vehicle function becomes un-obstructed as the handle is moved from the substantially vertical range to the not substantially vertical range.

6. A handle according to claim 3, wherein:
the first pair of gripping portions are dimensioned and located on the handle a distance apart within a range of 40 centimeters to 46 centimeters.

7. A handle according to claim 3, further comprising:
a tiller arm pivot that enables the tiller arm to move between a substantially vertical range and a not substantially vertical range;
wherein the first throttle actuator is enabled and the second throttle actuator is disabled when the tiller arm is in the substantially vertical range; and
wherein the first throttle actuator is disabled and the second throttle actuator is enabled when the tiller arm is not in the substantially vertical range.

8. A handle attached to a vehicle tiller arm comprising:
a first pair of gripping portions;
a second pair of gripping portions;
a first throttle actuator that is operable by either hand of an operator while the operator grasps each of the first pair of gripping portions and the tiller arm is substantially vertical;

a second throttle actuator that is operable by either hand of an operator while the operator grasps each of the second pair of gripping portions and the tiller arm is not substantially vertical;

a tiller arm pivot that enables the tiller arm to move between a substantially vertical range and a not substantially vertical range;

wherein the first throttle actuator is enabled and the second throttle actuator is disabled when the tiller arm is in the substantially vertical range; and wherein the first throttle actuator is disabled and the second throttle actuator is enabled when the tiller arm is not in the substantially vertical range.

9. A handle according to claim 8, wherein the first throttle actuator is configured to propel the vehicle to a maximum speed that is less than the maximum speed the second throttle actuator is configured to propel the vehicle to.

10. A handle according to claim 8, wherein:

the first pair of gripping portions are dimensioned and located on the handle a distance apart within a range of 40 centimeters to 46 centimeters.

11. A method for operating an industrial vehicle comprising:

moving a tiller arm having a handle attached thereto to a first position where the tiller arm is substantially vertical, wherein the handle includes a first throttle and a second throttle;

enabling the first throttle in response to moving the tiller arm to the first position and disabling the second throttle in response to moving the tiller arm to the first position;

grasping one grip of a first set of grips on the handle with one hand and another grip of the first set of grips with the other hand;

operating the first throttle while both hands remain grasping the first set of grips to move the industrial vehicle in a first direction;

operating the first throttle while both hands remain grasping the first set of grips to move the industrial vehicle in a second direction that is opposite to the first direction;

moving the tiller arm having the handle attached thereto to a second position where the tiller arm is not substantially vertical;

disabling the first throttle in response to moving the tiller arm to the second position and enabling the second throttle in response to moving the tiller arm to the second position;

grasping one grip of a second set of grips on the handle with one hand and another grip of the second set of grips with the other hand; and operating the second throttle while both hands remain grasping the second set of grips to move the industrial vehicle in the first direction; and operating the second throttle while both hands remain grasping the second set of grips to move the industrial vehicle in the second direction.

\* \* \* \* \*